United States Patent
Palm et al.

(10) Patent No.: US 10,004,078 B2
(45) Date of Patent: Jun. 19, 2018

(54) NETWORK NODE, WIRELESS DEVICE AND METHODS THEREIN FOR CONTROLLING A RADIO COMMUNICATION USING CARRIER AGGREGATION

(71) Applicant: Telefonaktiebolaget L M Ericsson (publ), Stockholm (SE)

(72) Inventors: Håkan Palm, Växjö (SE); Lisa Boström, Solna (SE); Tao Cui, Upplands Väsby (SE); Ingrid Nordstrand, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 37 days.

(21) Appl. No.: 14/910,003

(22) PCT Filed: Dec. 21, 2015

(86) PCT No.: PCT/SE2015/051380
§ 371 (c)(1),
(2) Date: Feb. 4, 2016

(87) PCT Pub. No.: WO2016/122372
PCT Pub. Date: Aug. 4, 2016

(65) Prior Publication Data
US 2016/0374069 A1    Dec. 22, 2016

Related U.S. Application Data

(60) Provisional application No. 62/109,791, filed on Jan. 30, 2015.

(51) Int. Cl.
*H04W 72/04* (2009.01)
*H04L 5/00* (2006.01)

(52) U.S. Cl.
CPC .......... *H04W 72/048* (2013.01); *H04L 5/001* (2013.01); *H04L 5/0098* (2013.01); *H04L 5/0023* (2013.01); *H04L 5/0053* (2013.01)

(58) Field of Classification Search
CPC .. H04B 17/318; H04B 7/0452; H04B 7/0626; H04B 7/063; H04L 1/0026;
(Continued)

(56) References Cited

U.S. PATENT DOCUMENTS

| 2011/0267978 | A1* | 11/2011 | Etemad | .................. | H04L 5/003 |
| | | | | | 370/254 |
| 2011/0319068 | A1* | 12/2011 | Kim | ...................... | H04L 1/1671 |
| | | | | | 455/422.1 |

(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.1, Dec. 2014, 1-410.
(Continued)

*Primary Examiner* — Jamal Javaid
*Assistant Examiner* — Rose Clark
(74) *Attorney, Agent, or Firm* — Murphy, Bilak & Homiller, PLLC

(57) ABSTRACT

A network node (600), a wireless device (602) and methods for controlling a radio communication using carrier aggregation. The wireless device (602) sends (6:1) UE capabilities to the network node (600), indicating a maximum capability limit per component carrier and a total maximum capability limit across all component carriers to be used in the radio communication. The network node (600) further selects (6:2) a number of component carriers to be used by the wireless device, and configures (6:3) radio features on the selected component carriers based on the received UE capabilities. The network node (600) then signals (6:4) the
(Continued)

selected number of component carriers and the configured radio features to the wireless device (602) for use in the radio communication (6:5). Thereby, the network node (600) can utilize the full capabilities of the wireless device (602) when configuring the radio features while still respecting both the maximum capability limit per carrier and the total maximum capability limit.

24 Claims, 4 Drawing Sheets

(58) Field of Classification Search
CPC .............. H04L 2001/0093; H04L 5/001; H04L 5/0023; H04L 5/0035; H04L 5/0053; H04L 5/0057; H04L 5/0073; H04L 5/0098; H04W 24/02; H04W 24/08; H04W 28/0252; H04W 28/16; H04W 36/0061; H04W 72/005; H04W 72/0453; H04W 72/048
See application file for complete search history.

(56) References Cited

U.S. PATENT DOCUMENTS

| | | | | |
|---|---|---|---|---|
| 2012/0083309 | A1* | 4/2012 | Kwon | H04B 17/24 455/522 |
| 2013/0095816 | A1* | 4/2013 | Gerstenberger | H04W 72/0406 455/422.1 |
| 2014/0204848 | A1* | 7/2014 | Geirhofer | H04B 7/024 370/329 |
| 2015/0124638 | A1* | 5/2015 | Sun | H04L 5/0053 370/252 |
| 2015/0358105 | A1* | 12/2015 | Jung | H04J 11/0056 370/329 |
| 2016/0205679 | A1* | 7/2016 | Yoo | H04L 1/0026 370/329 |

OTHER PUBLICATIONS

3GPP, "3rd Generation Partnership Project; Technical Specification Group Radio Access Network; Evolved Universal Terrestrial Radio Access (E-UTRA); User Equipment (UE) radio access capabilities (Release 12)", 3GPP TS 36.306 V12.3.0, Dec. 2014, 1-36.

Georgoulis, Stamatis, "Testing Carrier Aggregation in LTE-Advanced Network Infrastructure", Available online at http://www.techonlineindia.com/techonline/news_and_analysis/170955/testing-carrier-aggregation-lte-advanced-network-infrastructure, retrieved Jan. 30, 2015, Apr. 11, 2012, 1-10.

Unknown, Author, "On the Limitations of Contiguous CA Capability Signaling", 3GPP TSG-RAN WG2 #88, R2-145163, Qualcomm Incorporated, San Francisco, California, USA, Nov. 17-21, 2014, 1-4.

Unknown, Author, "[Draft] LS on UE Capabilities for MtMO layers and CSt processes", 3GPP TSG-RAN WG4 Meeting #73, R4-147124, San Francisco, Nov. 17-21, 2014, 1-1.

* cited by examiner

NETWORK NODE, WIRELESS DEVICE AND METHODS THEREIN FOR CONTROLLING A RADIO COMMUNICATION USING CARRIER AGGREGATION

TECHNICAL FIELD

The present disclosure relates generally to a network node of a radio network for wireless communication, a wireless device and methods therein, for controlling a radio communication between the network node and the wireless device using carrier aggregation.

BACKGROUND

In recent years, different types of radio networks have been developed to provide wireless communication for various wireless devices in different areas. The radio networks are constantly improved to provide better capacity, quality and coverage to meet the demands from subscribers using services and increasingly advanced equipment, such as smartphones and tablets, which often require considerable amounts of bandwidth and resources for data transport in the networks. Therefore, it is often a challenge to achieve good performance, e.g. in terms of high data throughput, low latency and low rate of dropped or lost data, in the radio communication between network nodes in the radio network and various wireless devices communicating with the network nodes.

In order to improve the performance of such radio communication, various radio features can be employed that are intended to make the radio communication more efficient. For example, in radio networks operating according to Long Term Evolution, LTE, features such as Carrier Aggregation, CA, and Multiple Input Multiple Output, MIMO, are commonly used as defined by the third Generation Partnership Project, 3GPP. In carrier aggregation, multiple carriers are used simultaneously in radio communication with a wireless device, while in MIMO multiple data streams are conveyed using multiple antenna ports at the sender node and at the receiver node. Carrier aggregation and MIMO are employed mainly to increase data throughput for a wireless device.

In the field of radio communication, the term "wireless device" is commonly used and will be used in this disclosure to represent any terminal or device capable of radio communication including receiving downlink signals transmitted from a network node and sending uplink signals to the network node. Throughout this disclosure, wireless device could e.g. be exchanged for User Equipment, UE, which is another common term in this field.

Further, the term "network node", also commonly referred to as a base station, radio node, e-nodeB, eNB, access point, etc., represents any node enabling radio access in a radio network which node can communicate uplink and downlink radio signals with wireless devices. The radio network may also be referred to as a cellular network for radio or wireless communication. The network nodes described in this disclosure may, without limitation, include so-called macro nodes and low power nodes such as micro, pico, femto, Wifi and relay nodes, to mention some customary examples. Throughout this disclosure, network node could e.g. be exchanged for base station or access point.

In carrier aggregation, a network node such as a base station or the equivalent is able to communicate radio signals with a wireless device simultaneously over two or more different carriers, sometimes referred to as Component Carriers, CC, corresponding to multiple cells serving the wireless device, which is illustrated by an example in FIG. 1. In this example, a network node 100 sends downlink signals to a wireless device 102 over three different carriers CC1, CC2 and CC3 which in turn provide coverage in three corresponding cells which may have overlapping or partly overlapping coverage. It should be noted that the configuration with three carriers and corresponding cells shown in FIG. 1 is just an illustrative example, and any number of carriers and cells may be employed for the carrier aggregation.

When serving the wireless device 102 with the carriers CC1, CC2 and CC3, one of the cells is appointed to act as a Primary cell, Pcell, in this example Pcell 1 which is served by a carrier CC1. The other two cells are appointed to act as Secondary cells, Scells, in this example Scell 2 and Scell 3 which are served by carriers CC2 and CC3, respectively. In this field of technology, a Pcell is defined as the "main" cell serving the wireless device such that both data and control signaling can be transmitted over the Pcell, while an Scell is defined as a supplementary cell that is typically used for transmitting data only, the Scell thus adding extra bandwidth to enable greater data throughput.

The above is applicable for both downlink and uplink signals. Further, the appointment of carriers, e.g. serving a Pcell and one or more Scells, is made per device such that a particular carrier may be used in a Pcell for one wireless device and in an Scell for another wireless device. For example in FIG. 1, the carrier CC1 which is used for serving the device 102 in a Pcell could at the same time be used for serving another device in an Scell, not shown. Similarly, the carrier CC2, or CC3, which is used for serving the device 102 in an Scell could at the same time be used for serving another device in a Pcell, not shown.

Carrier aggregation may thus be used in radio communication with a wireless device to support wider transmission bandwidths and thus higher data throughput. The wireless device must have reception and/or transmission capabilities for carrier aggregation such that it can simultaneously receive and/or transmit on multiple carriers, which is the case for wireless devices configured according to the third Generation Partnership Project, 3GPP, Rel-10 or later. In this way, the network node is able to serve several cells with basically the same coverage area as shown in FIG. 1, or with different coverage areas, at different carrier frequencies.

Carrier aggregation can be used both for uplink communication and for downlink communication. Further, it is possible to configure a wireless device to aggregate a different number of carriers in the uplink than in the downlink, still originating from the same network node, thus enabling different bandwidths in uplink and downlink. The maximum number of downlink carriers that can be configured for a wireless device depends on the downlink aggregation capability of the device. Similarly, the maximum number of uplink carriers that can be configured depends on the uplink aggregation capability of the device.

In MIMO, multiple antenna ports are used both at a sending node and at a receiving node in order to convey multiple spatially separated data streams between the sending and receiving nodes. MIMO can likewise be used both for uplink communication and for downlink communication. In uplink communication, the wireless device is the sending node and the network node is the receiving node, while in downlink communication, the network node is the sending node and the wireless device is the receiving node. According to LTE Rel-8, a network node can have 1, 2, or 4 physical antenna ports, and different reference signals are sent out on these antenna ports. In later releases, it is also possible to configure more than four antenna ports.

A wireless device can indicate, by signaling to its serving network node, its capability to support various features that can be configured by the network, such as multiple data streams in downlink and/or uplink communication within a reported frequency band. This signaling is commonly referred to as "UE capability signaling" which term is used throughout this disclosure to indicate signaling from a wireless device of its capability to use one or more radio features. Moreover, the network node can schedule data on one or more data streams in downlink and/or uplink via physical control channels and/or MAC control elements which are signaled to the wireless device.

As mentioned above, a specific radio feature, such as carrier aggregation using a specific number of carriers, or MIMO using a specific number of data streams or MIMO layers, may be employed in a network node which feature is intended to improve performance in the radio network, e.g. in terms of throughput. In order for the network node to be aware of which radio network features that are supported by a particular wireless device and can be used in a radio communication with the wireless device, the network node is able to request device capability information from the device to indicate what features the device supports. The device then responds with indicators of its supported radio features, either one indicator per feature or via feature group indicators where several radio features are indicated together. Such an indicator thus indicates whether the one or more radio features are supported or not.

The current UE capability signaling in case of intra-band contiguous carrier aggregation only allows the wireless device to signal UE capabilities that are applicable to all component carriers in a particular band. The lack of capability indication for each individual carrier requires that the UE always signals the minimum, or least, capability supported for all CCs, even though a greater or higher capability may be supported for a subset of the carriers, e.g. for one carrier. As a result, the device's true capability is possibly underutilized in case of contiguous carrier aggregation since the signaled minimum capability must be respected, i.e. not exceeded, when configuring radio features for the wireless device. It is thus a problem that the wireless device is sometimes restricted to use less radio features, e.g. less MIMO layers, than it is actually capable of using. With the introduction of higher order carrier aggregation (3CCs or more), this limitation may become even more notable for advanced devices and advanced features to be deployed in the radio network.

SUMMARY

It is an object of embodiments described herein to address at least some of the problems and issues outlined above. It is possible to achieve this object and others by using a network node of a radio network, a wireless device and methods therein, as defined in the attached independent claims.

According to one aspect, a method is provided in a network node of a radio network for wireless communication, for controlling a radio communication with a wireless device using carrier aggregation. In this method, the network node receives, from the wireless device, UE capabilities indicating a maximum capability limit for one or more radio features per component carrier and a total maximum capability limit for the one or more radio features across all component carriers to be used in the radio communication.

The network node then selects a number of component carriers to be used by the wireless device in the radio communication, and configures the one or more radio features on the selected component carriers based on the received UE capabilities. The network node finally signals the selected number of component carriers and the configured one or more radio features to the wireless device for use in the radio communication.

According to another aspect, a network node of a radio network for wireless communication is arranged to control a radio communication with a wireless device using carrier aggregation. The network node is configured to receive, from the wireless device, UE capabilities indicating a maximum capability limit for one or more radio features per component carrier and a total maximum capability limit for the one or more radio features across all component carriers to be used in the radio communication.

The network node is also configured to select a number of component carriers to be used by the wireless device in the radio communication, and to configure the one or more radio features on the selected component carriers based on the received UE capabilities. The network node is further configured to signal the selected number of component carriers and the configured one or more radio features to the wireless device for use in the radio communication.

According to another aspect, a method is provided in a wireless device for controlling a radio communication with a network node of a radio network for wireless communication using carrier aggregation. In this method, the wireless device sends UE capabilities to the network node, the UE capabilities indicating a maximum capability limit for one or more radio features per component carrier and a total maximum capability limit for the one or more radio features across all component carriers to be used in the radio communication. The wireless device further receives, from the network node, a number of component carriers and the one or more radio features being configured for use in the radio communication based on the sent UE capabilities.

According to another aspect, a wireless device is arranged to control a radio communication with a network node of a radio network for wireless communication using carrier aggregation. The wireless device is configured to send UE capabilities to the network node, the UE capabilities indicating a maximum capability limit for one or more radio features per component carrier and a total maximum capability limit for the one or more radio features across all component carriers to be used in the radio communication. The wireless device is also configured to receive, from the network node, a number of component carriers and the one or more radio features being configured for use in the radio communication based on the UE capabilities.

By employing any of the above methods and apparatuses, the network node is able to utilize the full capability of the wireless device when configuring radio features for the radio communication such that both the maximum capability limit per carrier and the total maximum capability limit across all carriers are respected but can be utilized in the radio communication.

The above network node, wireless device and methods therein may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
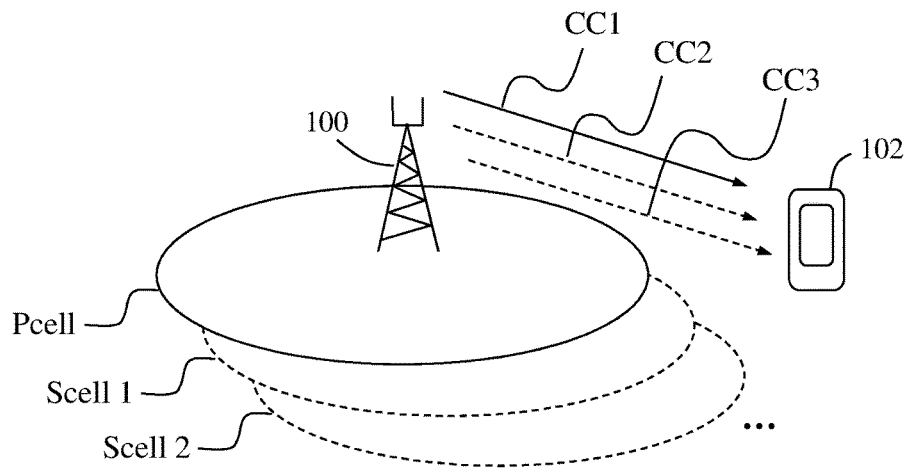
FIG. 1 illustrates a communication scenario as an example of how carrier aggregation can be used for downlink communication, according to the prior art.
Figure 2A:
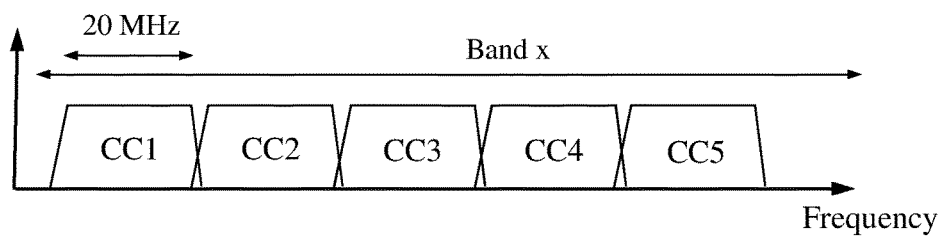
FIGS. 2A-2C illustrate some examples of carrier aggregation involving contiguous and non-contiguous carriers, where the solution may be employed.
Figure 2B:
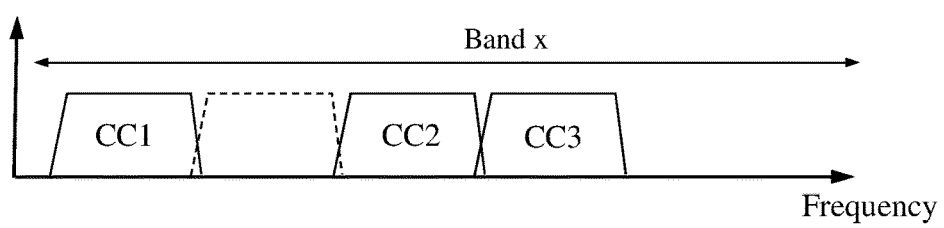
Figure 2C:
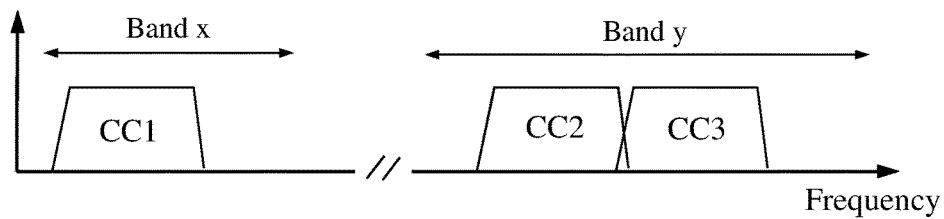

FIGS. 2A-2C illustrate some examples of how carrier aggregation with multiple component carriers, CCs, can be configured across one or more frequency bands. Each carrier has a bandwidth of 20 MHz in these examples. In FIG. 2A, five contiguous component carriers CC1-CC5 are configured within a single frequency band x, thus forming a "Contiguous intra-band carrier aggregation". In FIG. 2B, three component carriers CC1-CC3 are configured within the frequency band x such that there is a frequency gap between the first carrier CC1 and the second carrier CC2, thus forming a "Non-contiguous intra-band carrier aggregation".

In FIG. 2C, three component carriers CC1-CC3 are configured in two different and separated frequency bands x and y where the first carrier CC1 is configured in one frequency band x and the other two carriers CC2 and CC3 are configured in the other frequency band y. Consequently there is a substantial frequency gap between the first carrier CC1 and the second carrier CC2 across the bands x and y, thus forming a "Non-contiguous inter-band carrier aggregation".

Carrier aggregation is thus a radio feature allowing for flexible spectrum allocation in order to achieve wider bandwidth transmission for a wireless device. A complete system bandwidth of up to 100 MHz may include between two and five basic CCs. At least some of the CCs may be backward compatible with Release 8 LTE, and the aggregated bandwidth may be configured either with CCs from the same band as shown in FIGS. 2A, 2B, or with CCs from different bands as shown in FIG. 2C. LTE-A supports both contiguous and non-contiguous spectra for intra-band CA.

For Frequency Division Duplexing, FDD, asymmetric bandwidth may be supported for uplink and downlink communication. Symmetric communication is defined as the case where there are equal numbers of CCs for the downlink and uplink, while asymmetric communication typically uses a larger number of CCs for the downlink than for the uplink. In Time Division Duplexing, TDD, the uplink and downlink are always symmetric because the same carrier is used for both uplink and downlink communication. A further consideration is intra-band symmetry, as shown in FIG. 2 in the above reference, which relates to whether or not the aggregated carriers form a mirror image across the aggregate bandwidth.

In the 3GPP document R2-145163 it is described that the UE capability signaling can be done for each component carrier separately to be similar as currently done for non-contiguous carrier aggregation such that the wireless device thus signals its capabilities separately for each carrier, with the cost of largely increased UE capability signaling size. Since the wireless device does not indicate the carrier position together with the actual capability in each UE capability signaling, the network node cannot know which carrier in a contiguous aggregated bandwidth the respective UE capability corresponds to.

In wireless communications, Channel State Information, CSI, is a commonly used set of information that refers to known channel properties of a radio communication link. This information describes how a radio signal propagates from the transmitting node to the receiving node and represents the combined effect of, for example, scattering, fading, and power decay with distance. The CSI makes it possible to adapt transmissions to current channel conditions, which is useful or even crucial for achieving reliable communication with high data rates in multi-antenna systems. Certain CSI processes have been predefined and the wireless device typically supports at least one of these predefined CSI processes. The number of CSI processes supported by a wireless device is thus another example of a UE capability.

Currently, in existing UE capability signaling, the concerned UE capabilities comprise the supported MIMO layers and the supported CSI processes which are both related to the UE baseband processing capability. Depending on the number of CCs being aggregated, the UE baseband processing is shared among the configured serving cells. Therefore, there could be the case that the wireless device may support a higher number of MIMO layers and a higher number of CSI processes on one CC than on the other CCs used in carrier aggregation. However, as mentioned above the carrier position is not indicated together with the UE capability in the existing capability signaling, and it is a problem to be able to fully utilize all the available UE capability in the wireless device, instead of employing e.g. a fixed processing allocation for each CC.

In this disclosure, a solution is presented where the above-mentioned problem of underutilized capability can be avoided or at least reduced by employing a modified UE capability signaling when carrier aggregation is used, as follows. Instead of signaling a minimum or least capability that can be supported for every one of the component carriers, the wireless device signals to a serving network node a maximum capability limit that is supported for one component carrier which could be any one of the carriers used in the carrier aggregation. The wireless device also signals a total maximum capability limit that is supported across all component carriers used in the carrier aggregation. The network node is then able to configure one or more radio features for a radio communication with the wireless device, based on the signaled UE capabilities such that both the maximum capability limit per carrier and the total maximum capability limit across all carriers can be fully utilized.

The solution will be described in terms of procedures and apparatus in a network node of a radio network for wireless communication and in a wireless device, respectively, which can be used for a radio communication where the wireless device is served by the network node. An example of how the solution may be employed in terms of actions performed by a network node of a radio network for wireless communication, for controlling a radio communication with a wireless device using carrier aggregation, will now be described with reference to the flow chart in FIG. 3. This procedure can thus be used to accomplish the functionality described above, and some possible but non-limiting embodiments will also be described herein. The following actions may be performed by the network node as follows.

A first action 300 illustrates that the network node receives, from the wireless device, UE capabilities indicating a maximum capability limit for one or more radio features per component carrier and a total maximum capability limit for the one or more radio features across all component carriers to be used in the radio communication. In a possible embodiment, the received UE capabilities may indicate at least one of: supported number of CSI processes and supported number of MIMO layers. In another possible embodiment, the one or more radio features may comprise at least one of: configured CSI processes and configured MIMO layers.

In a next action 302, the network node selects a number of component carriers to be used by the wireless device in the radio communication. For example, the number of component carriers may be selected dependent on the type of service and its requirements for data rate. Alternatively or additionally, the number of component carriers may also be selected dependent on how much radio resources are available for use by the wireless device, which may in turn be dependent on the current amount of ongoing traffic in a cell served by the network node and/or in any neighbouring cells.

Another action 304 illustrates that the network node configures the one or more radio features on the selected component carriers based on the received UE capabilities. This means that the one or more radio features can be configured in a way that utilizes the full capabilities of the wireless device as indicated by maximum capability limit per carrier and the total maximum capability limit across all carriers. In another possible embodiment, the one or more radio features may be configured on the selected component carriers such that none of said maximum capability limit per component carrier and total maximum capability limit is exceeded, thus respecting the received UE capabilities to make sure that the wireless device fully supports the configured radio feature(s).

In a final shown action 306, the network node signals the selected number of component carriers and the configured one or more radio features to the wireless device for use in the radio communication. Thereby, it is an advantage that the network node can utilize the full capabilities of the wireless device when configuring the radio features while still respecting both the maximum capability limit per carrier and the total maximum capability limit.

In one example, the received UE capabilities may indicate that the maximum capability limit per component carrier is 4 MIMO layers and the total maximum capability limit is 12 MIMO layers. If the number of component carriers selected in action 302 is five, i.e. CC1-CC5, and a Contiguous intra-band carrier aggregation is employed, such as illustrated in FIG. 2A, the network node is able to configure the radio feature of MIMO with 4 MIMO layers on one of the five component carriers CC1-CC5 and with 2 MIMO layers on the remaining 4 component carriers, thus not exceeding 4 MIMO layers per component carrier nor 12 MIMO layers in total. In another possible embodiment, the carrier aggregation may involve multiple contiguous intra-band component carriers in the radio communication with the wireless device, such as in the above-mentioned example.

In another example, using the same UE capabilities as in the previous example, but when only three component carriers, i.e. CC1-CC3, are selected, such as illustrated in FIG. 2B or FIG. 2C, the network node is able to configure the radio feature of MIMO with 4 MIMO layers on all three component carriers CC1-CC3, thus not exceeding 4 MIMO layers per component carrier nor 12 MIMO layers in total.

In both examples above, the received UE capabilities are thus respected while the capabilities of the wireless device are fully utilized for achieving maximum data throughput.

In another possible embodiment, the maximum capability limit per component carrier and the total maximum capability limit may be indicated separately for uplink and downlink in the received UE capabilities. Thereby, the network node is able to fully utilize the capabilities of the wireless device on one or both of the uplink and the downlink while always respecting the received UE capabilities.

In another possible embodiment, the received UE capabilities may indicate that the wireless device supports one or more contiguous intra-band combinations. In that case, further possible embodiments may include that the received UE capabilities indicate for each contiguous intra-band combination, one or more of:

A) Band number which identifies the frequency band.
B) Number of supported component carriers in the contiguous intra-band combination, X.
C) Maximum number of supported MIMO layers for a single component carrier, M. This information is an example of the above-mentioned maximum capability limit for one or more radio features, in this case MIMO, per component carrier.
D) Maximum number of supported CSI processes for a single component carrier, N. This information is another example of the above-mentioned maximum capability limit for one or more radio features, in this case CSI, per component carrier.
E) Maximum total number of supported MIMO layers across all component carriers of the band combo, S. This information is an example of the above-mentioned total maximum capability limit for the one or more radio features, in this case MIMO, across all component carriers.
F) Maximum total number of supported CSI processes across all component carriers of the band combo, T. This information is another example of the above-mentioned total maximum capability limit for the one or more radio features, in this case CSI, across all component carriers.

Figure 4:
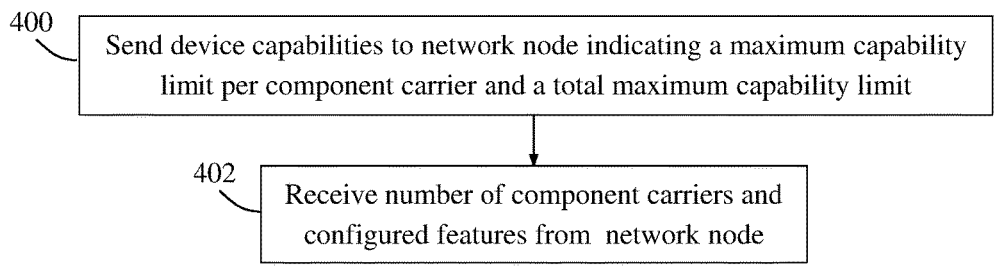
FIG. 4 is a flow chart illustrating a procedure in a wireless device, according to further possible embodiments.

An example of how the solution may be employed in terms of actions performed by a wireless device for controlling a radio communication with a network node of a radio network for wireless communication using carrier aggregation, will now be described with reference to the flow chart in FIG. 4. This procedure can thus be used to accomplish the functionality described above, and some possible but non-limiting embodiments will also be described herein. The following actions may be performed by the wireless device as follows.

A first action 400 illustrates that the wireless device sends UE capabilities to the network node. As in the above-described examples, the UE capabilities indicate a maximum capability limit for one or more radio features per component carrier and a total maximum capability limit for the one or more radio features across all component carriers to be used in the radio communication. In a next action 402, the wireless device receives, from the network node, a number of component carriers and the one or more radio features being configured for use in the radio communication based on the sent UE capabilities.

Some possible but non-limiting embodiments will now be described. In some possible embodiments, the sent UE capabilities may indicate at least one of: supported number of CSI processes and supported number of MIMO layers. In some further possible embodiments, the one or more radio features may comprise at least one of: configured CSI processes and configured MIMO layers. In another possible embodiment, said maximum capability limit per component carrier and total maximum capability limit may be indicated separately for uplink and downlink in the sent UE capabilities.

In another possible embodiment, the sent UE capabilities indicate that the wireless device supports one or multiple contiguous intra-band combinations. In that case, further possible embodiments may include that the sent UE capabilities may indicate, for each contiguous intra-band combination, one or more of:
  A) Band number.
  B) Number of supported component carriers in the contiguous intra-band combination, X.
  C) Maximum number of supported MIMO layers for a single component carrier, M.
  D) Maximum number of supported CSI processes for a single component carrier, N.
  E) Maximum total number of supported MIMO layers across all component carriers of the band combo, S.
  F) Maximum total number of supported CSI processes across all component carriers of the band combo, T.

Some further explanations and examples are presented below.

Thus, it may be sufficient that the wireless device indicates its total maximum capability and maximum capability per component carrier which may comprise a total number of MIMO layers and a total number of CSI processes that the wireless device can support for the entire contiguously aggregated carriers considering its full baseband processing capacity for each RF band. Based on the number of CCs configured for the wireless device, the network node may decide and then configure the MIMO layers and the CSI processes for each CC but within, i.e. not exceeding, the indicated total UE capability limitation. In case there are limitations regarding the maximum number of MIMO layers and CSI processes that can be supported by the wireless device for an individual CC, i.e. when the same limit applies to all CCs, this UE capability can be indicated by the wireless device as separate parameters. The network node is then able to configure the MIMO layers and CSI processes for each CC, respecting both the maximum limit per each CC, and the maximum number in total as indicated by the UE capabilities signaled by the wireless device.

It should be noted that the embodiments described herein are not limited to a "number of MIMO layers" and a "number of CSI processes", but they are applicable also for other features e.g. with similar requirements on UE baseband processing.

With the embodiments described herein, the UE capability signaling size will not be increased as much as compared to the proposal in the above-mentioned 3GPP document R2-145163, but still be able to address the drawback of underutilized UE capability in case of contiguous carrier aggregation.

In order to implement the above-described solution and embodiments, new capability information can be introduced to the current intra band contiguous CA capability signaling, e.g. to indicate:
  1. Maximum number of MIMO layers on uplink radio channel.
  2. Maximum number of MIMO layers on downlink radio channel.
  3. Maximum number of CSI processes.

The above information may be applicable to the entire aggregated bandwidth per intra band contiguous CA band combination.

In case there are limitations on the maximum number of MIMO layers and CSI processes that can be supported by the device for an individual CC (same limit applies to all CCs), this can be indicated by the wireless device as separate parameters.

It should be noted that the embodiments herein are not limited to "number of MIMO layers" and "number of CSI processes", but is applicable also for other features e.g. having similar requirements on UE baseband processing.

For backwards compatibility, the existing signaling of MIMO layers for uplink and/or downlink and CSI processes for intra-band contiguous CA may be kept to provide the minimum UE capability for the number of aggregated carriers of reported band combination.

For legacy wireless devices which do not support the total UE capability signaling, or wireless devices that support the same MIMO capability and CSI process for all carriers in case of intra-band contiguous CA, the existing signaling may still apply. In that case the legacy signaling would reflect the same MIMO and CSI capability on each CC.

Figure 5:
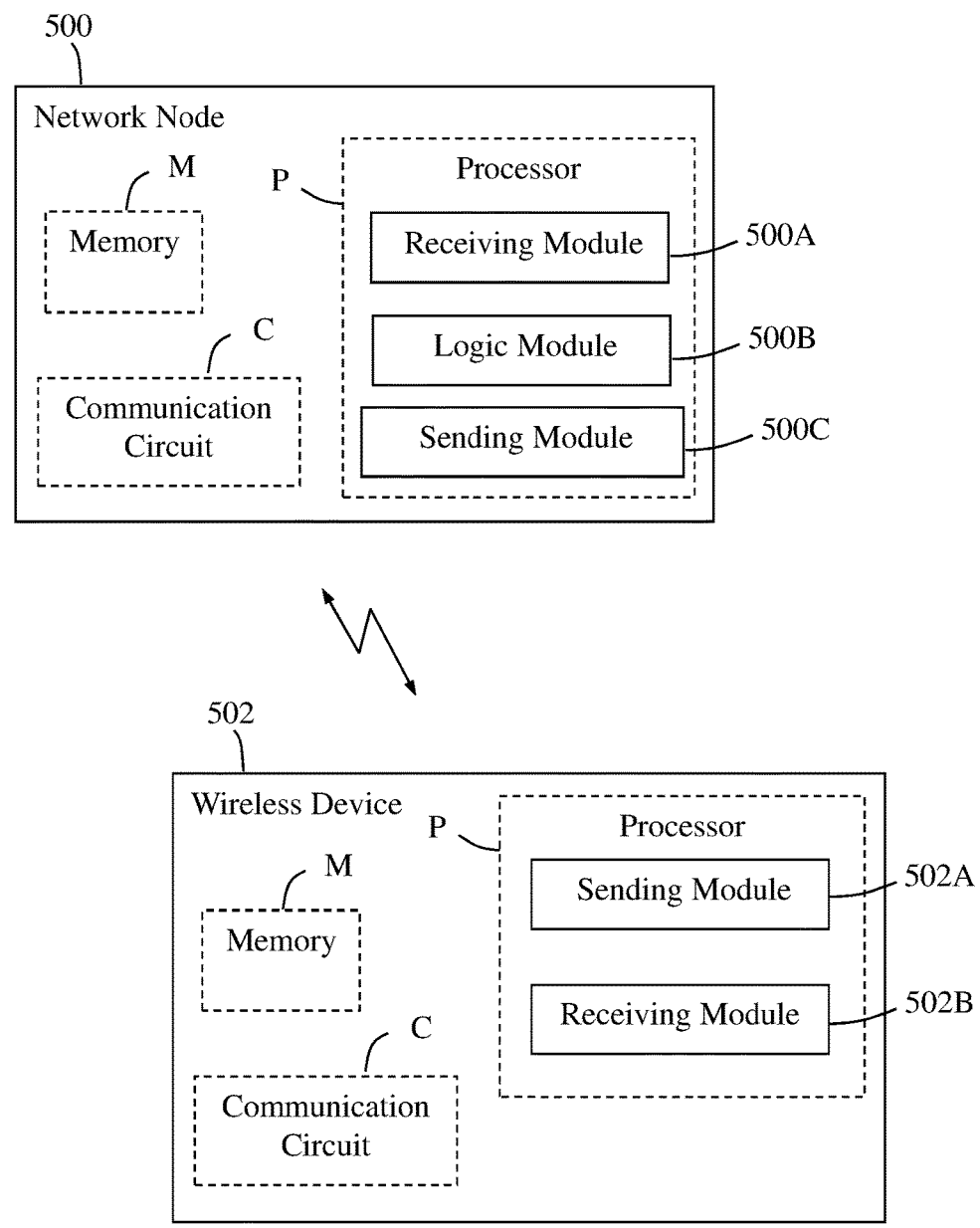
FIG. 5 is a block diagram illustrating how a network node and a wireless device may be structured and configured, according to further possible embodiments.

The block diagram in FIG. 5 illustrates a detailed but non-limiting example of how a network node 500 of a radio network for wireless communication and a wireless device 502, respectively, may be structured to bring about the above-described solution and embodiments thereof. In this figure, the network node 500 and the wireless device 502 may be configured to operate according to any of the examples and embodiments of employing the solution as described herein, where appropriate, and as follows. Each of the network node 500 and the wireless device 502 is shown to comprise a processor "P", a memory "M" and a communication module "C" with suitable equipment for transmitting and receiving signals with information in the manner described herein.

The communication module C in the wireless device 502 comprises suitable radio circuitry configured for radio communication with the network node 500 serving the wireless device 502 while the communication module C in the network node 500 of this example is configured for communication with the wireless device 502.

Figure 3:
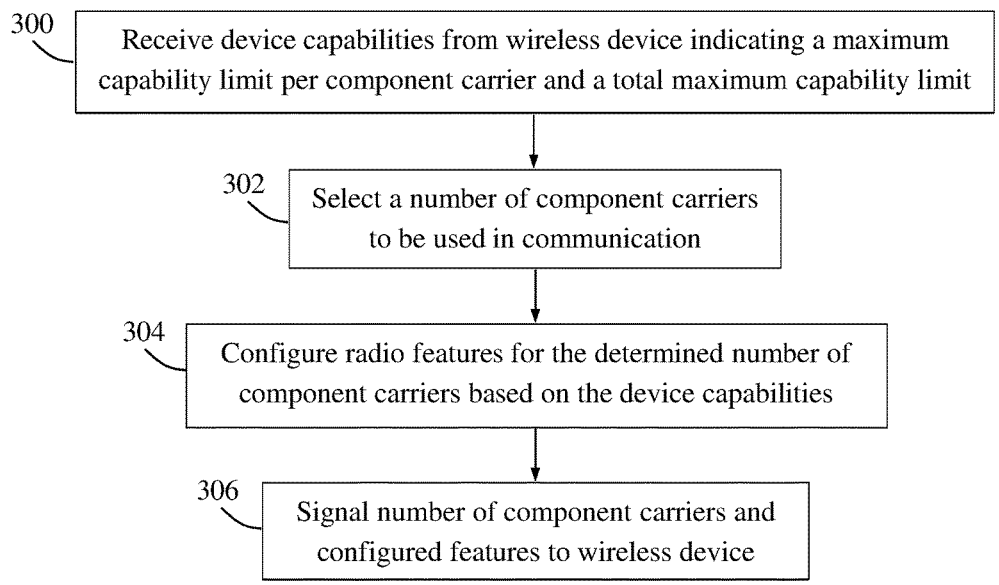
FIG. 3 is a flow chart illustrating a procedure in a network node, according to some possible embodiments.

The network node 500 comprises means configured or arranged to perform at least the actions 300-306 of the flow chart in FIG. 3 in the manner described below. These actions may be performed by means of suitable modules in the processor P in the network node 500 as follows. The network node 500 is arranged to control a radio communication with the wireless device 502 using carrier aggregation.

The network node 500 is configured to receive UE capabilities from the wireless device 502, as shown in action 300. The received UE capabilities indicate a maximum capability limit for one or more radio features per component carrier and a total maximum capability limit for the one or more radio features across all component carriers to be used in the radio communication. This receiving operation may be performed by a receiving module 500A in the network node 500.

The network node 500 is also configured to select a number of component carriers to be used in the radio communication, as shown in action 302. This selecting operation may be performed by a logic module 500B in the network node 500. As said above, the number of component carriers may be selected depending on the need for data rate in the radio communication and/or availability of radio resources.

The network node 500 is further configured to configure the one or more radio features on the selected component carriers based on the received UE capabilities, as shown in action 304. The radio features may comprise at least one of: configured CSI processes and configured MIMO layers. This configuring operation may be performed by the logic module 500B. The network node 500 is also configured to signal the selected number of component carriers and the configured one or more radio features to the wireless device 502 for use in the radio communication, as shown in action 306. This signaling operation may be performed by a sending module 500C in the network node 500.

The wireless device 502 comprises means configured or arranged to operate in the manner described above. This may be performed by means of different modules in the processor P in the wireless device 502 as follows. The wireless device 502 is arranged to control a radio communication with the network node 500, using carrier aggregation.

The wireless device 502 is configured to send UE capabilities to the network node 500 in the manner described herein, as shown in action 400. The sent UE capabilities indicate a maximum capability limit for one or more radio features per component carrier and a total maximum capability limit for the one or more radio features across all component carriers to be used in the radio communication. This sending operation may be performed by a sending module 502A in the wireless device 502.

The wireless device 502 is also configured to receive, from the network node 500, a number of component carriers and the one or more radio features being configured for use in the radio communication based on the UE capabilities, as shown in action 402. This receiving operation may be performed by a receiving module 502B in the wireless device 502.

It should be noted that FIG. 5 illustrates various functional modules in the network node 500 and the wireless device 502, respectively, and the skilled person is able to implement these functional modules in practice using suitable software and hardware. Thus, the solution is generally not limited to the shown structures of the network node 500 and the wireless device 502, and the functional modules 500A-C and 502A-B may be configured to operate according to any of the features described in this disclosure, where appropriate.

The functional modules 500A-C and 502A-B can be implemented in the network node 500 and the wireless device 502, respectively, by means of program modules of a respective computer program comprising code means which, when run by the processor P in each node causes the network node 500 and the wireless device 502 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 500 and the wireless device 502 in the form of a memory having a computer readable medium and being connected to the processor P. The computer program product or memory M in each of the network node 500 and the wireless device 502 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 500 and wireless device 502.

The solution described herein may be implemented by a computer program comprising instructions which, when executed on at least one processor, cause the at least one processor to carry out the actions according to any of the above embodiments. The solution may also be implemented in a carrier containing the above computer program, wherein the carrier is one of an electronic signal, optical signal, radio signal, or computer readable storage medium.

Figure 6:
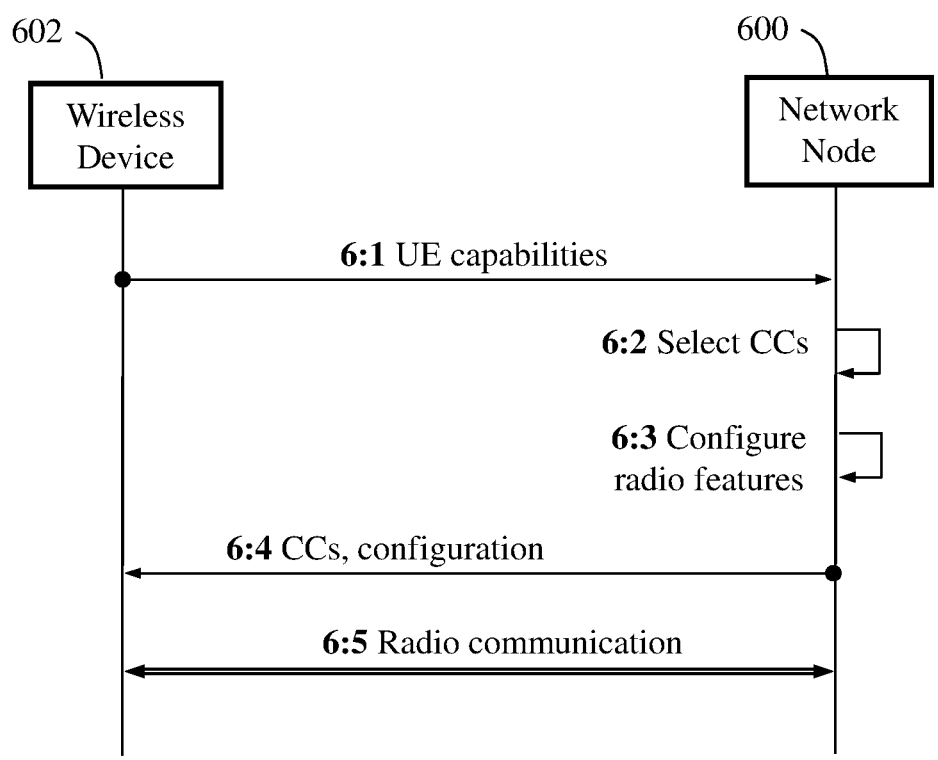
FIG. 6 is a signaling diagram illustrating an example of a communication between a network node and a wireless device, according to further possible embodiments.

An example of how a network node and a wireless device may operate in a radio communication will now be described with reference to the signalling diagram in FIG. 6. In this example, the network node 600 may correspond to the network node 500 in FIG. 5 and may be configured to operate in the manner described for FIG. 3. Further, the wireless device 602 may correspond to the wireless device 502 in FIG. 5 and may be configured to operate in the manner described for FIG. 4. The actions in this example are performed as follows.

Action 6:1: The wireless device 602 signals its UE capabilities to the network node 600. As in the previous examples, the UE capabilities indicate a maximum capability limit for one or more radio features per component carrier and a total maximum capability limit for the one or more radio features across all component carriers to be used in the radio communication. The signalled UE capabilities may further indicate that the wireless device 602 supports one or multiple Contiguous intra-band combinations, in short: "band-comb".

For each band-comb, the wireless device 600 may indicate one or more of:

A) Band number.
B) Number of supported component carriers in the Contiguous intra-band comb, X.
C) Max number of supported MIMO layers for an individual component carrier, M.
D) Max number of CSI processes for an individual component carrier, N.
E) Max total number of supported MIMO layers across all component carriers of the band comb, S.
F) Max total number of supported CSI processes across all component carriers of the band comb, T.

Action 6:2: The network node 600 selects a number of component carriers to use in the radio communication. The network node 600 may choose to use one, more or all of the available component carriers and use them for the radio communication with the wireless device 602.

Action 6:3: The network node 600 configures radio features on the component carriers based on the received UE capabilities. For example, the network node 600 may select to use one or more MIMO layers and CSI processes on each component carrier, while respecting that the number of MIMO layers on each CC does not exceed M, and that the total number of MIMO layers across all CC's does not exceed S. Similar selection may be made for CSI processes.

Action 6:4: The network node 600 signals to the wireless device 602 the number of component carriers and the radio feature configuration according to the above actions 6:2 and 6:3.

Action 6:5: A radio communication between the network node 600 and the wireless device 602 is performed on the selected component carriers according to the radio feature configuration above.

While the solution has been described with reference to specific exemplary embodiments, the description is generally only intended to illustrate the inventive concept and should not be taken as limiting the scope of the solution. For example, the terms "network node", "wireless device", "component carrier", "UE capabilities", and "radio features" have been used throughout this description, although any other corresponding entities, functions, and/or parameters could also be used having the features and characteristics described here.

The invention claimed is:

1. A method, in a network node of a radio network for wireless communication, for controlling a radio communication with a wireless device using carrier aggregation, the method comprising:
receiving, from the wireless device, user equipment (UE) capability information comprising a first parameter indicating a maximum per-component-carrier capability limit for at least one radio feature, from among per-component-carrier capability limits for each component carrier, and a second parameter indicating a total maximum capability limit for the at least one radio feature across all component carriers to be used in the radio communication, wherein said maximum per-component-carrier capability limit and total maximum capability limit are indicated separately for uplink and downlink in the received UE capability information;
selecting a number of component carriers to be used by the wireless device in the radio communication;
configuring the at least one radio feature on the selected component carriers based on the received UE capability information; and
signaling the selected number of component carriers and the configured at least one radio feature to the wireless device for use in the radio communication.

2. The method of claim 1, wherein the received UE capability information indicates at least one of: a supported number of channel-state-information (CSI) processes and a supported number of multiple-input multiple-output (MIMO) layers.

3. The method of claim 1, wherein the at least one radio feature comprises at least one of: configured channel-state-information (CSI) processes and configured multiple-input multiple-output (MIMO) layers.

4. The method of claim 1, wherein the at least one radio feature is configured on the selected component carriers such that neither the maximum per-component-carrier capability limit nor the total maximum capability limit is exceeded.

5. The method of claim 1, wherein the carrier aggregation involves multiple contiguous intra-band component carriers in the radio communication with the wireless device.

6. The method of claim 1, wherein the received UE capability information indicates that the wireless device supports one or more contiguous intra-band combinations.

7. The method of claim 6, wherein the received UE capability information indicates, for each contiguous intra-band combination, one or more of:
A) a band number;
B) a number of supported component carriers in the contiguous intra-band combination;
C) a maximum number of supported multiple-input multiple-output (MIMO) layers for any single component carrier of the supported component carriers;
D) a maximum number of supported channel-state-information (CSI) processes for any single component carrier of the supported component carriers;
E) a maximum total number of supported MIMO layers across all component carriers of the band combo; and
F) a maximum total number of supported CSI processes across all component carriers of the band combo.

8. A network node of a radio network for wireless communication, arranged for controlling a radio communication with a wireless device using carrier aggregation, the network node comprising:
communication circuitry configured to communicate with the wireless device using carrier aggregation;
a processor operatively coupled to the communication circuitry; and
a memory operatively coupled to the processor and storing a computer program for execution by the processor, whereby the network node is configured to:
receive, from the wireless device, user equipment (UE) capability information comprising a first parameter indicating a maximum per-component-carrier capability limit for at least one radio feature, from among per-component-carrier capability limits for each component carrier, and a second parameter indicating a total maximum capability limit for the at least one radio feature across all component carriers to be used in the radio communication, wherein said maximum per-component-carrier capability limit and total maximum capability limit are indicated separately for uplink and downlink in the received UE capability information;
select a number of component carriers to be used by the wireless device in the radio communication;
configure the at least one radio feature on the selected component carriers based on the received UE capability information; and
signal the selected number of component carriers and the configured at least one radio feature to the wireless device for use in the radio communication.

9. The network node of claim 8, wherein the received UE capability information indicates at least one of: a supported number of channel-state-information (CSI) processes and a supported number of multiple-input multiple-output (MIMO) layers.

10. The network node of claim 8, wherein the at least one radio feature comprises at least one of: configured channel-state-information (CSI) processes and configured multiple-input multiple-output (MIMO) layers.

11. The network node of claim 8, wherein the network node is arranged to configure the at least one radio feature on the selected component carriers such that neither the maximum per-component-carrier capability limit nor the total maximum capability limit is exceeded.

12. The network node of claim 8, wherein the carrier aggregation involves multiple contiguous intra-band component carriers in the radio communication with the wireless device.

13. The network node of claim 8, wherein the received UE capability information indicates that the wireless device supports one or more contiguous intra-band combinations.

14. The network node of claim 13, wherein the received UE capability information indicates, for each contiguous intra-band combination, one or more of:
A) a band number;

B) a number of supported component carriers in the contiguous intra-band combination;

C) a maximum number of supported multiple-input multiple-output (MIMO) layers for any single component carrier of the supported component carriers;

D) a maximum number of supported channel-state-information (CSI) processes for any single component carrier of the supported component carriers;

E) a maximum total number of supported MIMO layers across all component carriers of the band combo; and F) a maximum total number of supported CSI processes across all component carriers of the band combo.

15. A method in a wireless device for controlling a radio communication with a network node of a radio network for wireless communication using carrier aggregation, the method comprising:

sending user equipment (UE) capability information to the network node, the UE capability information comprising a first parameter indicating a maximum per-component-carrier capability limit for at least one radio feature, from among per-component-carrier capability limits for each component carrier, and a second parameter indicating a total maximum capability limit for the at least one radio feature across all component carriers to be used in the radio communication, wherein said maximum per-component-carrier capability limit and total maximum capability limit are indicated separately for uplink and downlink in the sent UE capability information, and receiving, from the network node, a number of component carriers and the at least one radio feature being configured for use in the radio communication based on the sent UE capability information.

16. The method of claim 15, wherein the sent UE capability information indicates at least one of: a supported number of channel-state-information (CSI) processes and a supported number of multiple-input multiple-output (MIMO) layers.

17. The method of claim 15, wherein the at least one radio feature comprises at least one of: configured channel-state-information (CSI) processes and configured multiple-input multiple-output (MIMO) layers.

18. The method of claim 15, wherein the sent UE capability information indicates that the wireless device supports one or multiple contiguous intra-band combinations.

19. The method of claim 18, wherein the sent UE capability information indicates, for each contiguous intra-band combination, one or more of:

A) a band number;

B) a number of supported component carriers in the contiguous intra-band combination;

C) a maximum number of supported multiple-input multiple-output (MIMO) layers for any single component carrier of the supported component carriers;

D) a maximum number of supported channel-state-information (CSI) processes for any single component carrier of the supported component carriers;

E) a maximum total number of supported MIMO layers across all component carriers of the band combo; and F) a maximum total number of supported CSI processes across all component carriers of the band combo.

20. A wireless device for controlling a radio communication with a network node of a radio network for wireless communication using carrier aggregation, the wireless device comprising:

communication circuity configured to communicate with the network node using carrier aggregation;

a processor operatively coupled to the communication circuitry; and a memory operatively coupled to the processor and storing a computer program for execution by the processor, whereby the wireless device is configured to:

send user equipment (UE) capability information to the network node, the UE capability information comprising a first parameter indicating a maximum per-component-carrier capability limit for at least one radio feature, from among per-component-carrier capability limits for each component carrier, and a second parameter indicating a total maximum capability limit for the at least one radio feature across all component carriers to be used in the radio communication, wherein said maximum per-component-carrier capability limit and total maximum capability limit are indicated separately for uplink and downlink in the sent UE capability information, and receive, from the network node, a number of component carriers and the at least one radio feature being configured for use in the radio communication based on the UE capability information.

21. The wireless device of claim 20, wherein the UE capability information indicates at least one of: a supported number of channel-state-information (CSI) processes and a supported number of multiple-input multiple-output (MIMO) layers.

22. The wireless device of claim 20, wherein the at least one radio feature comprises at least one of: configured channel-state-information (CSI) processes and configured multiple-input multiple-output (MIMO) layers.

23. The wireless device of claim 20, wherein the UE capability information indicates that the wireless device supports one or multiple contiguous intra-band combinations.

24. The wireless device of claim 23, wherein the UE capability information indicates, for each contiguous intra-band combination, one or more of:

A) a band number;

B) a number of supported component carriers in the contiguous intra-band combination;

C) a maximum number of supported multiple-input multiple-output (MIMO) layers for any single component carrier of the supported component carriers;

D) a maximum number of supported channel-state-information (CSI) processes for any single component carrier of the supported component carriers;

E) a maximum total number of supported MIMO layers across all component carriers of the band combo; and F) a maximum total number of supported CSI processes across all component carriers of the band combo.

* * * * *